United States Patent [19]

Shankar et al.

[11] Patent Number: 5,610,820
[45] Date of Patent: Mar. 11, 1997

[54] MINIMUM PROPELLANT, ZERO MOMENTUM SPACECRAFT ATTITUDE CONTROL SYSTEM

[75] Inventors: Uday J. Shankar, Plainsboro; Neil E. Goodzeit, East Windsor, both of N.J.; George E. Schmidt, Jr., Newtown, Pa.

[73] Assignee: Martin Marietta Corp., East Windsor, N.J.

[21] Appl. No.: 511,936

[22] Filed: Mar. 23, 1995

[51] Int. Cl.[6] ........................................... B64G 1/24
[52] U.S. Cl. .............................. 364/434.023; 364/432; 244/164; 244/165; 244/167
[58] Field of Search ............................ 364/434, 435, 364/449, 459, 456, 432, 433; 244/164, 165, 166, 171, 3.21; 318/610

[56] References Cited

U.S. PATENT DOCUMENTS

| | | | |
|---|---|---|---|
| 3,866,025 | 2/1975 | Cavanagh | 364/434 |
| 4,062,509 | 12/1977 | Muhlfelder et al. | 244/166 |
| 4,424,948 | 1/1984 | Muhlfelder et al. | 244/170 |
| 4,848,706 | 7/1989 | Garg et al. | 244/169 |
| 5,025,381 | 6/1991 | Goodzeit et al. | 364/434 |
| 5,098,041 | 3/1992 | Uetrecht | 244/164 |
| 5,248,118 | 9/1993 | Cohen et al. | 244/164 |
| 5,308,024 | 5/1994 | Stetson, Jr. | 244/165 |
| 5,310,143 | 5/1994 | Yocum et al. | 364/459 |
| 5,335,179 | 8/1994 | Boka et al. | 364/434 |
| 5,354,016 | 10/1994 | Goodzeit et al. | 244/165 |

*Primary Examiner*—Kevin J. Teska
*Assistant Examiner*—Tan Nguyen
*Attorney, Agent, or Firm*—W. H. Meise; C. A. Berard; S. A. Young

[57] ABSTRACT

A zero-momentum spacecraft's attitude is controlled by determining the torque required about a control axis to maintain the desired attitude, and, during each of recurrent control cycles, enabling a magnetic torquer if the torque demand exceeds a threshold. During each of the control cycles, thruster(s) are enabled to make up the difference between the torque demand and the estimated torque produced by the magnetic torquer. In determining the torque demand, the attitude rate signal is low-pass filtered to reduce noise, and the control loop bandwidth is maintained by totalling the estimated torque applied by the magnetic torquer and thrusters, integrating and high-pass filtering the estimated torque signals, and adding the filtered estimated torque with the filtered attitude rate signals to generate low-noise attitude rate signals. A three-axis system is described.

21 Claims, 5 Drawing Sheets

MINIMUM PROPELLANT, ZERO MOMENTUM SPACECRAFT ATTITUDE CONTROL SYSTEM

FIELD OF THE INVENTION

This invention relates to spacecraft attitude control systems, and particularly to such systems which are usable in the presence of noisy attitude control signals.

BACKGROUND OF THE INVENTION

Conventional communication spacecraft or satellites are required to operate in a near-zero momentum condition, maintaining one body axis of the spacecraft, and the associated antennas, directed toward a particular location on the surface of the Earth. Zero-momentum spacecraft use torquers and control systems to orient the body of the spacecraft, and to maintain the desired body orientation.

The earliest spacecraft used body rotation to maintain attitude by virtue of angular momentum. This, in turn, required that, if an Earth-pointing instrument or antenna was required, that a portion of the body of the spacecraft be "de-spun". Later spacecraft eliminated the de-spinning function, by using torquers to control the attitude of the body, which in turn results in the instruments and/or antennas being directed in the desired direction.

In order to reduce the amount of propellant used by thrusters, zero-momentum spacecraft have in the past used electrically driven torquing arrangements. One such electrically driven torquing arrangement is in the form of magnetic coils mounted on the spacecraft body, which interact with the Earth's magnetic fields to produce body torque about the spacecraft roll and yaw axes. Because the North-to-South direction of the Earth's magnetic field lies along the pitch axis of a spacecraft in an equatorial orbit, magnetic torquing cannot be applied about the pitch axis.

Another form of electrically driven torquing arrangement includes momentum wheels or reaction wheels for providing torques about the control axes, and, in the case of momentum wheels, for providing gyroscopic stiffness about one or more of the control axes. These electrically-driven magnetic or wheel-type torquing arrangements eliminate the need to fire propellant-consuming thrusters for attitude control, which is very advantageous, because the available propellant can then be used exclusively for north-south and/or east-west stationkeeping, which results in a longer operational lifetime.

It has been found, however, that the momentum of the reaction or momentum wheels tends to increase with time in a secular manner. Because there is a limit on the rotational speed which a wheel can withstand, some additional torquing must be periodically applied to the spacecraft body, to maintain the momentum wheel rotational rate within limits. Magnetic torquers are used for reducing the wheel speed, and chemical thrusters are used when the magnetic torquers cannot provide sufficient torque. Thus, notwithstanding the presence of the two types of electrically-driven torquers on a spacecraft, it is still necessary to occasionally use chemical thrusters to provide torque, and the maximum remaining lifetime of the spacecraft is reduced as propellant is consumed.

The ANIK E2 spacecraft, launched in 1991 with an expected life of more than thirteen years, included magnetic torquers, a momentum wheel with a rotational axis lying along the pitch axis, pivotable about the roll axis, and also included a complement of chemical thrusters. Its attitude control system was autonomous, utilizing an Earth sensor assembly (ESA) for roll and pitch attitude sensing, together with pitch control torquing by wheel-speed variation. The yaw was not sensed; the yaw control was by gyroscopic stiffness in the roll and yaw axes, together with roll-yaw orbital interchange. Yaw/roll control was provided using magnetic torquers. As a result of an unusual anomaly in the space environment, both the primary and backup momentum wheels became inoperative, with the result that gyroscopic stiffness about the roll and yaw axes, and momentum-wheel pitch-axis attitude control were not possible. Since spacecraft are extremely expensive, it became very desirable to have some means for providing attitude control for a period of time commensurate with the remaining expected lifetime of the spacecraft.

Attitude control for the ANIK E2 after loss of the pitch wheels was complicated by the lack of spacecraft gyroscopic stiffness, and the loss of normal pitch control actuation. Because of the decoupling of the roll and yaw due to the lack of gyroscopic stiffness, a yaw measurement was needed, which had not originally been required, nor planned for. The available resources aboard the ANIK E2 included the magnetic torquers, the pitch and roll on-board ESA attitude sensor, and individual thruster actuators. A set of gyroscopes was also available, but these gyros had a design life of substantially less than the expected spacecraft life; consequently, the gyros could not be used continuously for attitude sensing for the desired duration of the mission. The on-board attitude processor was fully functional, but the autonomous attitude control processing logic portion which depended upon a momentum bias in its implementation was not reprogrammable. The two-way time lag for communications between an Earth or ground station and the spacecraft is about 0.25 second. The spacecraft uplink control channel was originally intended for use with an autonomous attitude control system, for commanding the operating state of communication transponders, and the like. The uplink channel has a two second command cycle. An attitude control system usable under the described conditions was needed.

SUMMARY OF THE INVENTION

A zero-momentum spacecraft's attitude is controlled by determining the torque required about a control axis to maintain the desired attitude, and, during each of recurrent control cycles, enabling a magnetic torquer if the torque demand exceeds a threshold. During each of the control cycles, thruster(s) are enabled to make up the difference between the torque demand and the estimated torque produced by the magnetic torquer. In determining the torque demand, the attitude rate signal is low-pass filtered to reduce noise, and the control loop bandwidth is maintained by totalling the estimated torque applied by the magnetic torquer and thrusters, high-pass filtering the estimated torque signals, and adding the filtered estimated torque with the filtered attitude rate signals to generate low-noise attitude rate signals. A three-axis system is described.

More particularly, the spacecraft attitude control system maintains the spacecraft body in a particular attitude. The system includes a magnetic torquing arrangement mounted on the body, for, when enabled, torquing the body about a particular axis. A thruster arrangement is mounted on the body, for, when enabled, producing torque about the particular axis. An attitude sensing arrangement senses the attitude of the spacecraft body about the particular axis, and generates attitude-representative signals. An attitude error processing arrangement is coupled to the attitude sensing arrangement, and to a source of attitude command signals, if required, for determining, during each of a plurality of recurrent control intervals, the amount of torque required about the particular axis for tending to maintain the particular attitude. A distribution arrangement is coupled to the attitude error processing arrangement, to the magnetic torquing arrangement, and to the thruster arrangement, for, during each of the control intervals, energizing the magnetic torquing arrangement in response to the torque required, and for, during each of the recurrent control intervals, if the torque required is greater than the torque which the magnetic torquing arrangement provides, enabling the thruster arrangement for generating torque representative of the difference between the torque required and the torque which the magnetic torquing arrangement supplies. This essentially operates the magnetic torquer and the thruster simultaneously, with preference given to the magnetic torquer. The control system includes specialized filters, which reduce the noise in the estimate of the applied torque sufficiently to allow high loop gain, as required for accurate zero momentum attitude control.

The control system includes a source of three-axis attitude bias command signals, and first, second and third torquing arrangement coupled to the body, for applying torques to the body about first, second and third mutually orthogonal axes, respectively, in response to weighted control signals. Attitude sensing arrangements are coupled to the body for generating attitude signals representative of spacecraft attitude. An estimated control torque generating arrangement is coupled to receive the weighted control signals, for generating estimated control torque signals representative of the control torque applied by the torquing arrangement in response to the weighted control signals. First, second and third processors are coupled to the attitude sensing arrangement and to the source of three-axis attitude bias command signals for at least generating attitude error signals about each of the first, second and third axes, and for, in at least one of the three axes, (a) low-pass prefiltering the attitude signals to form low-pass prefiltered attitude signals with reduced noise, (b) subtracting the attitude bias command signals from the prefiltered attitude signals to generate attitude error signals, (c) integrating the attitude error signals to generate attitude integral signals, (d) differentiating the low-passed filtered attitude signals to form rate signals, (e) low-pass filtering the rate signals to generate low-noise rate signals, (f) integrating and high-pass filtering the estimated control torque signals to form high-frequency rate estimate signals, and (g) summing the low-noise rate signals with the high-frequency rate estimate signals, to form pseudo-rate error signals. A proportional-integral-derivative (PID) control arrangement is coupled to at least one of the first, second and third processors, for multiplying the attitude error signals, attitude integral signals, and pseudo-rate signals by first, second and third gains, respectively, to form weighted attitude error signals, weighted attitude integral signals, and weighted pseudo-rate signals, and for summing the weighted attitude error signals, weighted attitude integral signals, and weighted pseudo-rate signals to form a summed attitude control signal, and for multiplying the summed attitude control signals by a controller gain for the corresponding axis, to thereby generate a weighted control signal for the axis. A distribution arrangement is coupled to the PID control arrangement and to the thrusters, for distributing the weighted control signals to those thrusters providing control about the axis or axes being controlled, and for converting the weighted control signal to a form usable by the thrusters, for thereby closing a control loop tending to maintain the attitude of the spacecraft.

In a particular embodiment of the invention, the first, second and third torquing arrangements include chemical thrusters and their actuators, for, when fired, providing torques about roll, pitch and yaw axes. In this embodiment, the roll and pitch signals from the ESA are transmitted from the spacecraft to the ground station. The yaw sensing is determined at a ground station from antenna polarization measurements. The estimated control torque generating arrangement, the prefilters, first, second and third processors are at the ground station. The PID processor and distributor are also at the ground station. The ground station transmits information to the spacecraft with instructions to the various thrusters and magnetic torquers.

Another embodiment of the invention takes advantage of the characteristics of the control system, and includes the attitude signal processing on-board the spacecraft. In this embodiment, the momentum control wheels need not be provided, and the weight saved by not using momentum wheels may be used for additional propellant or payload.

DESCRIPTION OF THE INVENTION

Figure 1:
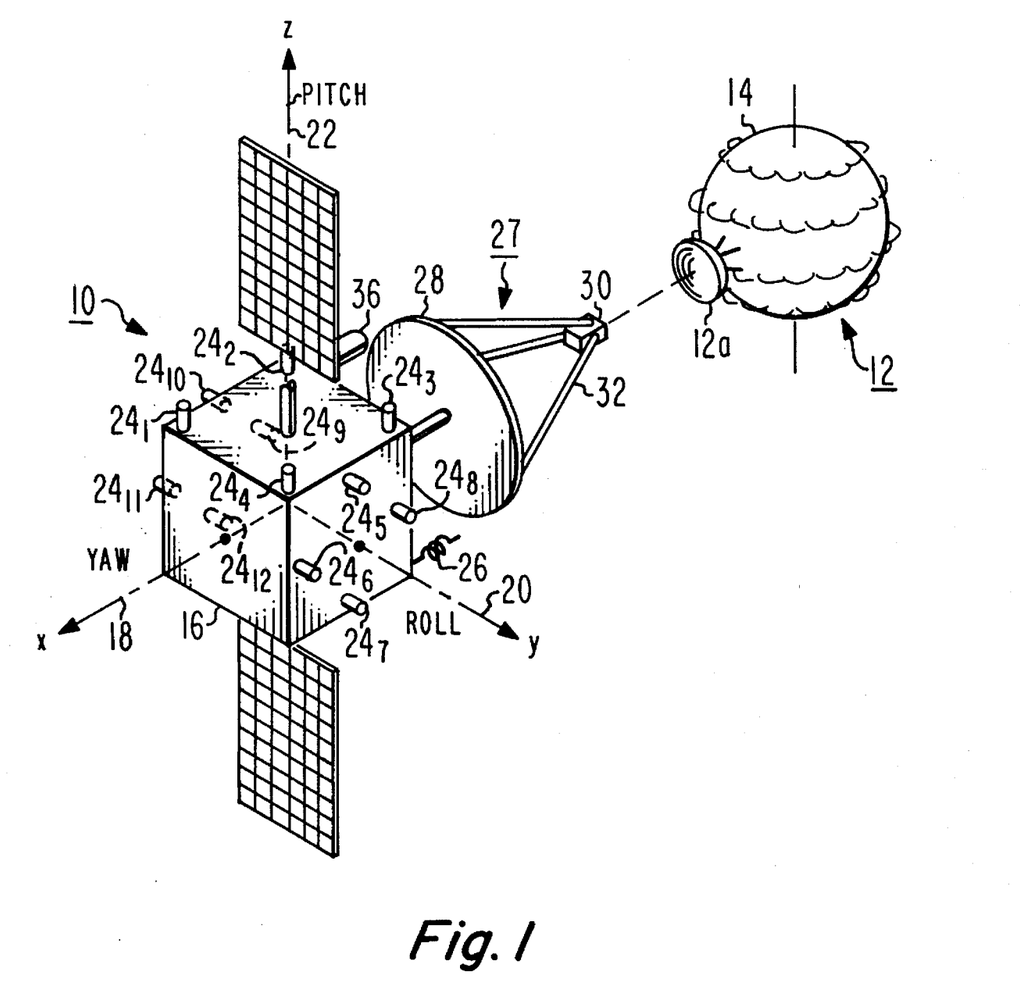
FIG. 1 is a perspective or isometric view of a spacecraft according to the invention, in orbit around the Earth, and in communication with a ground station.

FIG. 1 illustrates a spacecraft 10 communicating with a ground station 12 located on the surface of Earth 14. Spacecraft 10 includes a body 16, oriented with respect to yaw (x), roll (y), and pitch (z) axes 18, 20, and 22, respectively. Each face of body 16 has associated therewith one or more attitude control thrusters, some of which are designated $24_N$, where N is a thruster designation. A telemetry antenna 26 is directed toward an antenna 12a of a ground station 12. A communications antenna 27, illustrated as a reflector 28, with a feed 30 mounted on struts 32, faces corresponding antenna 12a of ground station 12. An Earth sensing assembly (ESA) 36 is mounted on the Earth-facing side of body 16, for producing signals representative of pitch and roll, as known in the art.

Figure 2:
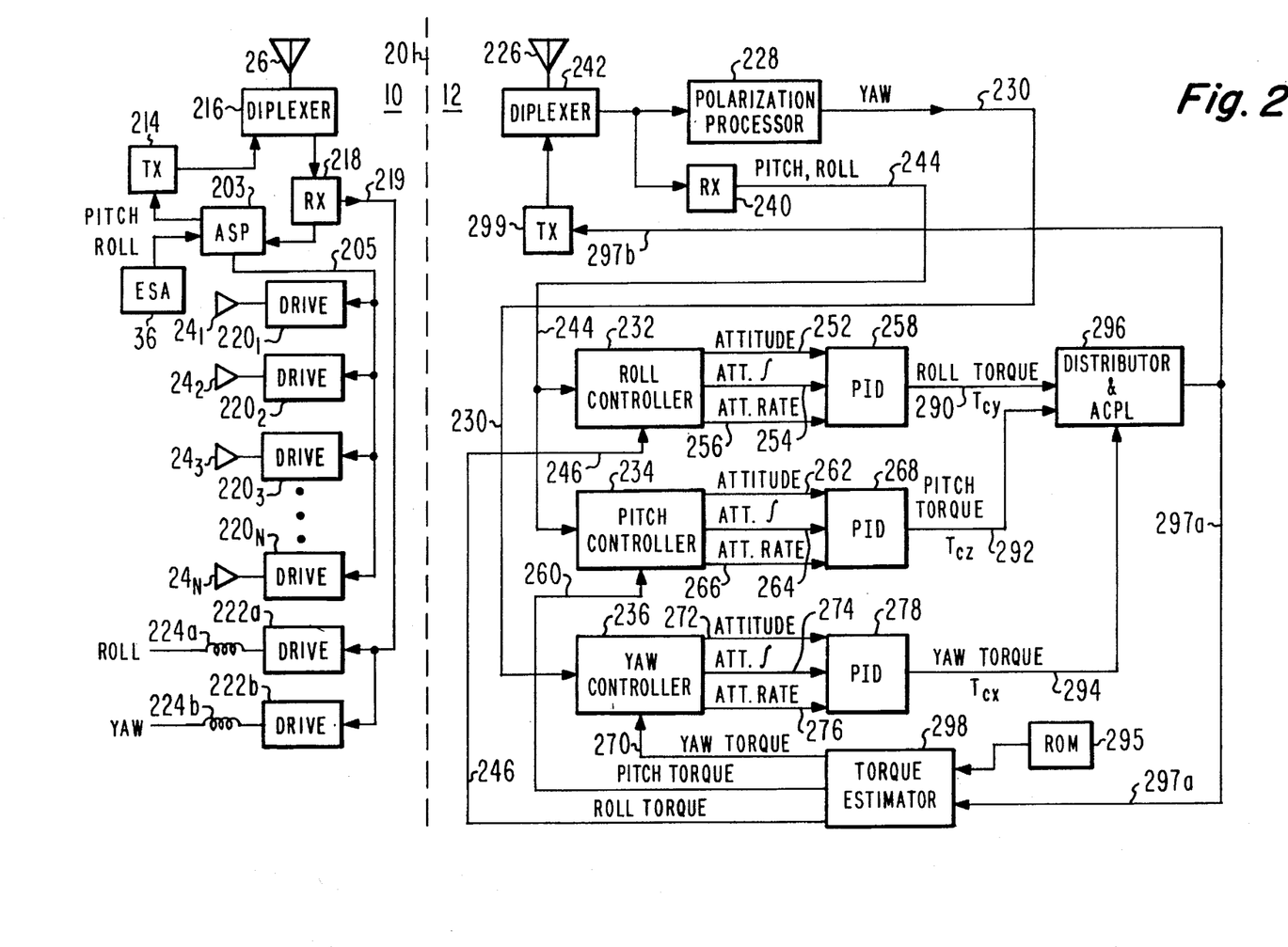
FIG. 2 is a simplified block diagram of a control system according to one embodiment of the invention.

FIG. 2 is an overall block diagram of an attitude control system according to an aspect of the invention. In FIG. 2, that portion of the diagram to the left of dash line 201 represents that portion of the control system within the spacecraft 10 of FIG. 1, while the right portion 212 represents that portion of the control system located at the ground station. Elements of FIG. 2 which correspond to those of FIG. 1 are designated by like reference numerals. In FIG. 2, ESA 36 couples signals representative of pitch and roll to a transmitter (TX) 214 by way of an Attitude System Processor (ASP) 203. The on-board attitude signal processor is capable of storing a commanded attitude, and subtracting the commanded angle from the measured attitude to form an attitude error signal. The roll or pitch error signals are made into roll or pitch angle signals by setting the commanded angles to zero. The ASP 203 is also capable of filtering and/or averaging the roll and pitch signals to reduce noise. The roll signals from ASP 203 are 32-sample running averages, and the pitch signals are two-sample averages. These filtered and/or averaged pitch and roll signals are sent by transmitter 214, by way of a diplexer 216 if required, to transponder antenna 26, for transmission from the spacecraft to the ground station.

In the ANIK E2 attitude control arrangement, payload antenna 27 transmits at least some of its signal with a known linear polarization, and yaw information is derived from the polarization as it is received at the ground station. For simplicity in describing the invention of FIG. 2, the telemetry antenna 26, which transmits the telemetry signal, transmits at least some of its signals with a known linear polarization, which has a particular orientation relative to body 16 of spacecraft 10 of FIG. 2.

Figure 5:
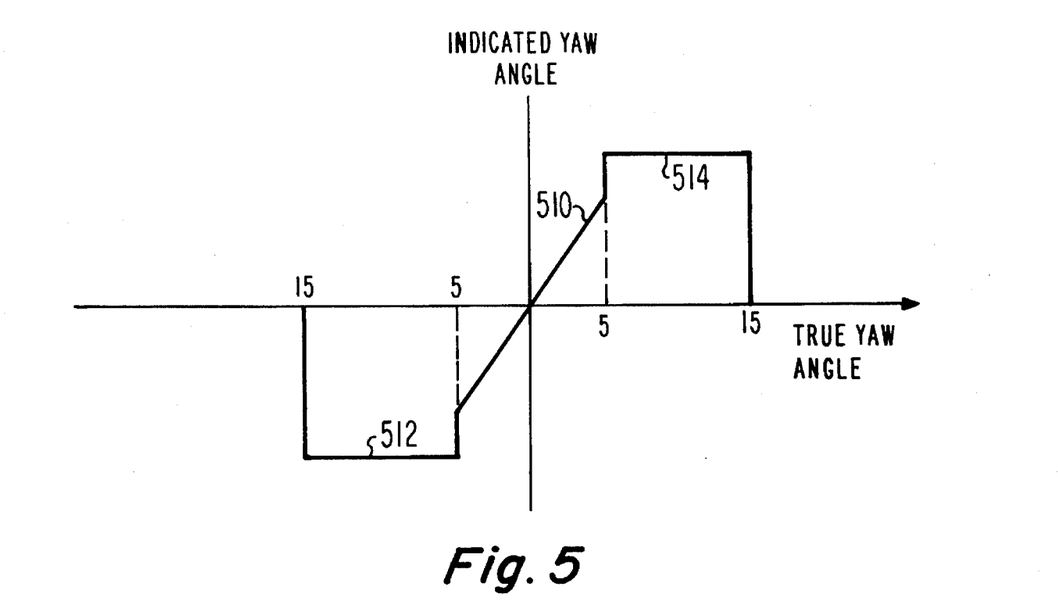
FIG. 5 is a plot of the response of the yaw sensor.

In the ANIK E2 embodiment, the true-yaw-angle-to-indicated-yaw-angle transfer function is as illustrated in FIG. 5. A linear yaw measurement range 510 extends from about $-5°$ to $+5°$, and further saturated ranges 512, 514, in which only polarity information is available, extend to about $\pm 15°$. Beyond $\pm 15°$, no yaw information is available.

The telemetry transmissions from antenna 26 (or from another spacecraft antenna, as described above) of FIG. 2 are transmitted to another antenna 226, located at ground station 212. Antenna 226 may be a dual-linear-polarization antenna, as known in the art, which separately receives each of two linearly polarized signals, or which separates or resolves a single linearly polarized signal into two orthogonal components, which, in conjunction with a polarization processor 228, is indicative of the yaw orientation of the spacecraft body. Polarization processor 228 converts the two components into a yaw angle, and produces a signal representative of the current state of the yaw of the spacecraft. The yaw signal so generated has been found to be very noisy. The yaw signal is sent by way of a path 230 to a yaw control processor 236.

The pitch- and roll-representative signals processed by the ASP 203 of FIG. 2, and transmitted by telemetry antenna 26, are received by antenna 226 at the ground station 212, and are coupled to a receiver (RX) 240, by way of a diplexer 242, if required. Receiver 240 extracts the signals representative of the pitch and roll, and applies them, by way of a path 244, to pitch and roll control processors 232 and 234, respectively. As described below, roll control processor 232 receives the roll-representative signals from path 244, receives estimates of the roll torque from path 246, and generates roll attitude representative signals on a path 252, roll attitude integral signals on a path 254, and roll rate signals on a path 256, all for application to a proportional-integral-derivative (PID) processor 258. Similarly, pitch control processor 234 receives the pitch-representative signals from path 244, and estimates of the pitch torque from path 260, and generates pitch attitude representative signals on a path 262, pitch attitude integral signals on a path 264, and yaw rate signals on a path 266, all for application to a PID processor 268. In the same way, yaw control processor 236 receives the yaw-representative signals by way of path 230, and estimates of the yaw torque from path 270, and generates yaw attitude representative signals on a path 272, yaw attitude integral signals on a path 274, and pitch rate signals on a path 276, all for application to a PID processor 278. Details of a control processor such as 232, 234, or 236 are explained below in conjunction with FIG. 3.

Each of PID controllers 258, 268, and 278 of FIG. 2 multiples the corresponding attitude-representative signals, the attitude-integral-representative signals, and the attitude-rate-representative signals applied thereto by weights, to form weighted signals, and then sums the weighted signals, and weights the summed signal, all in known fashion, to produce a torque demand signal $T_c$. For example, as described in greater detail below in conjunction with FIG. 4, roll PID processor 258 of FIG. 2 receives the roll-attitude-representative signal over path 252 from roll controller 232, the roll attitude integral signal over path 254, and the roll attitude rate signal over path 256, and produces a roll torque demand signal $T_{cy}$ on a path 290 for application to a distribution processor (distributor) 296. Distributor 296 performs processing, according to an aspect of the invention, for distributing the torque demand to the magnetic torquers insofar as possible, and, when the magnetic torquers are insufficient to supply the torque demand, as described below, for distributing the remaining torque among the various chemical thrusters of the spacecraft, in accordance with their known thrust directions, or preferably from their effective thrust directions, which may differ from the actual thrust direction, as, for example, due to plume impingement effects. The signals produced by distributor 296, representing the magnetic torquer ON/OFF states and the thrust pulse widths, as described below, are applied over a signal path 297a to a torque estimator 298, and over a signal path 297b to a transmitter 299. Transmitter 299 transmits the torquer magnetic state and thrust pulse width representative signals by way of diplexer 242, antenna 226, antenna 26, and diplexer 216 to a receiver 218 at the spacecraft 10.

The magnetic torquer state and thruster pulse width-representative signals transmitted to receiver 218 of spacecraft portion 10 of FIG. 2 from ground antenna 226 are extracted from the transmitted signals by receiver 218, and the magnetic torquer state representative signals are applied, by way of a signal path 219, to the corresponding one of drivers 222a and 222b for magnetic roll and yaw torquers 224a and 224b, respectively. The thruster pulse width representative signals are applied to ASP 203, which uses the operable and accessible thruster control processing to produce commands on a signal path 205 for application to thruster drivers $220_1$, $220_2$, $220_3$, . . . , $220_N$. Drivers 220 respond to their own particular signals, and respond by energizing or firing their associated thrusters $24_1$, $24_2$, $24_2$, . . . $24_N$, with a pulse duration specified in the commands, to provide the desired torque. In general, the thruster control is by means of thruster pulse-width or pulse-duration ON-OFF modulation in the ANIK E2 embodiment.

Torque estimator 298 of FIG. 2 receives the magnetic torquer state and thruster pulse width representative signals by way of path 297a, and uses the signals, in conjunction with a table of estimated magnetic torques which can be produced by the magnetic torquers, and a table of torques which can be produced by the thrusters of the spacecraft. The tables may be preloaded into ROM 295, or into RAM if periodic updating is required, and accessed by estimator 298. The estimated torques are based upon various parameters, such as the locations of the thrusters on the spacecraft and their thrusts, and the thrust vector directions. Thus, torque estimator block 298 produces estimates of the torques produced by the torquers and thrusters about each of the roll, pitch and yaw axes. The resulting roll torque, pitch torque, and yaw torque estimates are applied over paths 246, 260, and 270, respectively, to roll controller 232, pitch controller 234, and yaw controller 236, respectively.

Figure 3:
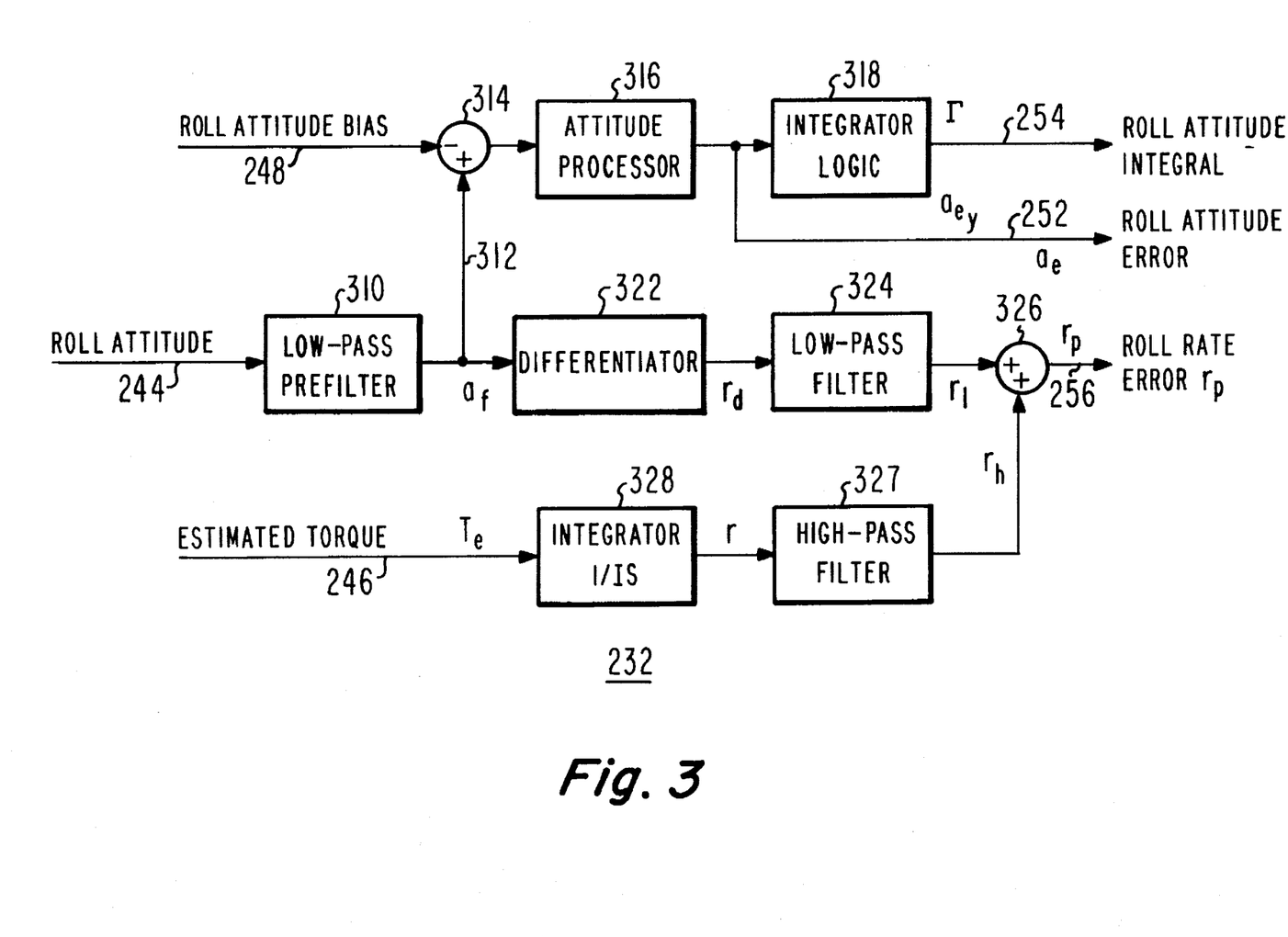
FIG. 3 is a simplified block diagram of a control logic portion of the arrangement of FIG. 2.

FIG. 3 is a simplified block diagram of a controller in accordance with an aspect of the invention, which may be used as any one of controllers 232, 234, or 236 in the ground-based portion of the arrangement of FIG. 2. For definiteness, roll controller 232 is illustrated and described. In FIG. 3, a roll attitude signal is received from path 244 and is applied to a block 310. Block 310 represents an $n^{th}$-order low-pass prefilter, used to further reduce the noise in the roll attitude signal originating from ESA 36 and processed by the ASP 203 of FIGS. 1 and 2, to produce a filtered attitude signal $a_f$. The term "$n^{th}$-order," in this context, means a filter described by a second-order difference equation of the form $$y_k = D_1 y_{k-1} + D_2 y_{k-2} + \ldots + D_n y_{k-n} + C_0 U_k + C_1 U_{k-1} + \ldots + C_n U_{k-n} \quad (1)$$

where:

$y_k$ is the filter output;

$D_1$, $D_2$, $D_n$, $C_0$, and $C_1$, and $D_n$ are filter coefficients, one set for each axis;

$y_{k-1}$, $y_{k-2}$ are the previous-sample filter outputs; and $U_k$ is the filter input;

$U_{k-1}$ is the previous-sample filter input signal.

The low-pass filtered roll signal $a_f$ produced by filter 310 of FIG. 3 is applied over a path 312 to a differentiator 322 and to the noninverting (+) input of a subtracting circuit 314. The inverting (−) input port of subtracting circuit 314 receives a signal over a path 248 which represents a pointing offset which may be desired away from zero roll. It is easy to understand that if the desired offset signal is zero, subtracting circuit 314 simply replicates the filtered roll attitude signal on its output signal path, which in effect makes the boresight of the ESA the target attitude. If the desired pointing offset is non-zero, the effective target attitude of the system is offset from the boresight.

The filtered roll-angle-representative signal produced at the output of subtracting circuit 314 of FIG. 3 is applied to an attitude processing block 316, which generates the roll component $a_{e_y}$ of the attitude error vector $$\bar{a}_e = (a_{e_x}, a_{e_y}, a_{e_z}) \quad (2)$$

(where the overbar represents a vector quantity) and also generates the roll component of the integral update gain vector $K_{u_y}$ $$\bar{K}_u = (K_{u_x}, K_{u_y}, K_{u_z}) \quad (3)$$

from the filtered attitude errors by the following equations $$\begin{aligned}
&IF(|a_{f_i}| \leq \bar{a}_{int_i}) \ THEN \\
&\quad a_{e_i} = a_{f_i} \\
&\quad K_{u_i} = 1 \\
&ELSE \ IF(|a_{f_i}| \leq \bar{a}_{err_i}) \ THEN \\
&\quad a_{e_i} = a_{f_i} \\
&\quad K_{u_i} = 0 \\
&ELSE \\
&\quad a_{e_i} = SIGN(a_{f_i}) \bar{a}_{max_i} \\
&\quad K_{u_i} = 0 \\
&ENDIF
\end{aligned} \quad (4)$$

where:

subscript i represents any of spacecraft control axes x, y or z;

vector $\bar{a}_{int} = (a_{intx}, a_{inty}, a_{intz})$ represents the integral update limits;

vector $\bar{a}_{err} = (a_{errx}, a_{erry}, a_{errz})$ are the attitude error limits; and vector $\bar{a}_{max} = (a_{maxx}, a_{maxy}, a_{maxz})$ are the attitude error clamp limits.

The integral update limits are less than the attitude error limits, which in turn are smaller than the attitude error clamp limits. The attitude error limits must be less than the saturation value 514 in FIG. 5.

Essentially, equations (4) state that the attitude error $a_e$ along any axis equals the filtered attitude error $a_f$, and $K_u$ equals 1, if the magnitude of $a_f$ is smaller than the integral update limit $a_{int}$. If $a_f$ is not smaller than $a_{int}$, and if the magnitude of the filtered attitude error is less than the attitude error limit $a_{err}$, then the attitude error $a_e$ is again set to equal to the filtered attitude error $a_f$, but $K_u$ is set equal to zero. If neither of the conditions is present, then attitude error is set to the attitude error clamp limit $a_{max}$, with the same sign (plus or minus) as the value of $a_f$, and $K_u$ is set to zero. When $K_u$ is set to zero, the value of the attitude integral does not change (the integrator is disabled). When $K_u = 1$, the attitude error is integrated.

The roll attitude error signal $a_e$ produced on path 252 of FIG. 3 by attitude processor 316 of FIG. 3 is applied to integrator logic illustrated as a block 318, which integrates the roll attitude error signal $a_e$ to produce a roll attitude integral signal $\Gamma$ on output signal path 254. The attitude integrals, at instant k, are calculated as $$\Gamma_{i_k} = \Gamma_{i_{k-1}} + \Delta t K_{u_i} a_{e_i} \quad (5)$$

where i takes on the values x, y and z;

$\Gamma_{i_{k-1}}$ is the attitude integral calculated for the previous sample; and $\Delta t$ is the processing sample interval.

In the ANIK E2 embodiment, the processing sample interval is 2 seconds for roll and pitch, and 1 second for yaw.

The filtered roll attitude signal $a_f$ produced on signal path 312 by filter block 310 of FIG. 3 is applied to a block 322, which represents a differentiator. Differentiation of the filtered roll attitude signal $a_f$ generates derived attitude rate $(r_d)$ signals representative of roll attitude rate.

$$r_{dk} = (a_{f_k} - a_{f_{k-1}})/\Delta t \quad (6)$$

The roll attitude rate signals $r_d$ are applied to a block 324 of FIG. 3, which represents a low-pass filter. As mentioned above, such a filter is described by equation (1). The resulting low-frequency roll attitude rate signal $r_l$ component of vector $\bar{r}_l = (r_{lx}, r_{ly}, r_{lz})$ is applied to a first noninverting input port of a summing circuit designated 326 of FIG. 3, where it is combined or summed with a high-frequency rate estimate $r_h$ derived from the control torques.

A block 328 in FIG. 3 represents an integrator, which uses the known spacecraft roll inertia $I_j$ to convert the estimated roll torque $(T_e)$ received over signal path 246 from torque estimator 298 of FIG. 2 into rate information r. The rate information r from integrator 328 is applied to a high-pass filter 329, which high-pass filters the estimated roll rate signal to produce a filtered estimated roll rate signal $r_h$. Summing circuit 326 of FIG. 3 receives the high-passed roll torque estimate signal $r_h$ from block 327 at its second noninverting input port, and sums it with the low-frequency roll attitude rate signal $r_l$ from block 324, to produce a composite roll rate or "pseudo rate" error signal $r_p$ on path 256, $r_p = r_l + r_h$. While only roll control processor 232 has been described, pitch control processor 234 and yaw control processor 236 are identical, except for the signals which they process.

Figure 4:
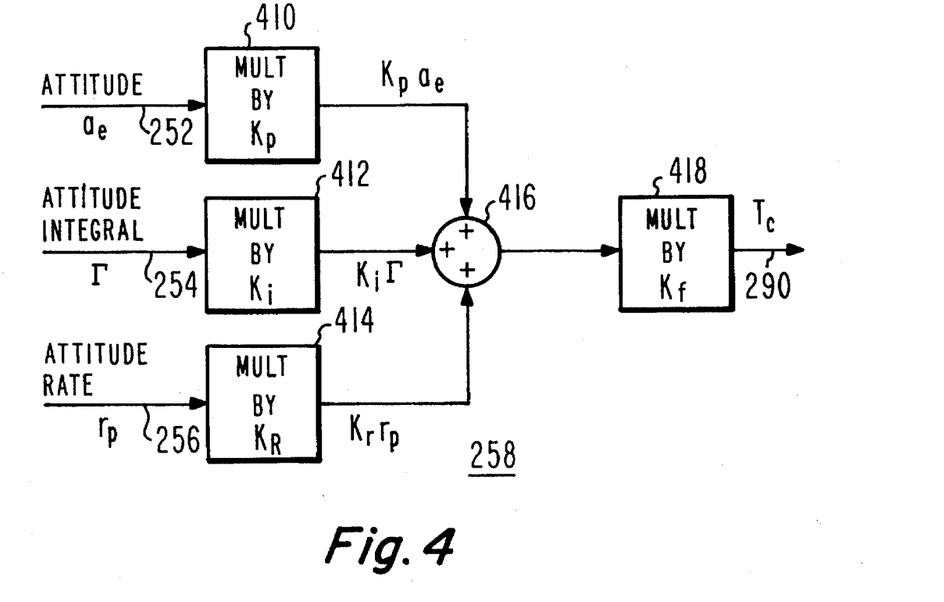
FIG. 4 is a simplified block diagram of a PID processor which may be used in the arrangement of FIG. 2.

FIG. 4 is a simplified block diagram of one of proportional-integral-derivative (PID) processors 258, 268, and 278 of FIG. 2. The three PID processors are mutually identical. For definiteness, roll PID processor 258 is illustrated and described. In FIG. 4, elements corresponding to those of FIG. 2 are designated by like reference numerals. In FIG. 4, roll-attitude-representative signals $a_e$ are applied over signal path 252 to a block 410, which represents multiplication or weighting of the attitude signal $a_e$ by a position gain constant or factor $K_p$; the resulting weighted signal is applied to a first noninverting input port of a summing circuit 416. The roll attitude integral signal $\Gamma$ on signal path 254 is applied to a block 412, which represents weighting of the attitude error signal by an integral gain constant $K_i$; the resulting weighted roll attitude integral signal is applied to a second noninverting input port of summing circuit 416. Similarly, the composite roll attitude rate signal $r_p$ is applied over signal path 256 to a block 414, which represents weighting by a rate gain constant $K_r$, and the resulting weighted signal is applied to a third noninverting input port of summing circuit 416. Summing circuit 416 produces a sum of weighted signals, and the sum is itself further weighted by a constant $K_f$ in a further block 418. The weighted sum signal $$T_{c_i} = K_{f_i}(K_p a_{e_i} + K_r r_{p_i} + K_i \Gamma_i) \tag{7}$$

where
i is x, y or z;
$\overline{T}_c = (T_{cx}, T_{cy}, T_{cz})$ are the torque demands;
$\overline{K}_f = (K_{fx}, K_{fy}, K_{fz})$ are the forward gains;
$\overline{K}_p$ is the position gain;
$\overline{K}_r$ is the rate gain; and
$\overline{K}_i$ is the integral gain.
is generated on output signal path 290.

The attitude control system operates in two distinct modes, the acquisition mode and the normal operating mode. The acquisition mode uses the available short-lifetime gyros in a conventional manner, and is not a part of the invention. The following description of the operation of the attitude control system relates to the normal operating mode.

The Actuator Command Processing Logic (ACPL) associated with distributor 296 of FIG. 2 receives roll, pitch and yaw torque demand signals $T_{cy}$, $T_{cz}$, $T_{cx}$, respectively, from PID controllers 258, 268, and 278 of FIG. 2. At the beginning of each control cycle, the pulse widths for each of the attitude control thrusters and the yaw and roll magnetic torques, are set to zero.

$$\Delta = 0$$
$$T_{m_x} = 0$$
$$T_{m_y} = 0 \tag{8}$$

The pitch impulse demand $I_z$ is calculated from the pitch torque demand $T_{c_z}$ as $$I_z = \Delta_c T_{c_z} \tag{9}$$

where $\Delta_c$ is the control period. The pitch pulse width $\Delta_z$ is then calculated as $$\Delta_z = K_\Delta I_z \tag{10}$$

where $K_\Delta$ is the pitch-impulse to pitch-pulse-width gain. The pitch pulse width $\Delta_z$ is then limited in accordance with equations 11, 12, and 13 so that small values of pulse width are not allowed.

$$\text{IF } (|\Delta_z| < \Delta_{min}) \text{ THEN } \Delta_z = 0 \tag{11}$$

where $\Delta_{min}$ is the minimum pitch pulse width. If the pitch pulse width is greater than the maximum pitch pulse width, the value of the pitch pulse width is set equal to the maximum pitch pulse width $$\text{IF } (|\Delta_z| > \Delta_{max}) \text{ THEN } \Delta_z = \Delta_{max} \text{ SIGN } (\Delta_z) \tag{12}$$

Since the available pulse widths may have a finite resolution, the value of the pitch pulse width is then resolved $$\Delta_z = \text{INT } (\Delta_z/\Delta_{res} + \text{SIGN } (\Delta_z) 0.01) \Delta_{res} \tag{13}$$

where $\Delta_{res}$ is the pulse width resolution.

With the pitch thruster pulse width determined, it is then possible to stipulate which of the thrusters are to be used. For example, in a normal set of thrusters, either thruster 6 or 11 could be selected, depending upon the direction of pitch correction desired. Under abnormal conditions, such as failure of a thruster such as thruster 6, "odd-mode" thrusters might be selected, which would entail selection of thruster 9 instead of 6 for one direction of pitch correction, or thruster 11 for the other direction of pitch correction. If thruster 11 were unavailable, the even set of thrusters (6 and 8) might be selected. The pulse widths for the thrusters are therefore calculated from the pitch pulse width $\Delta_z$ as

| | | (14) |
|---|---|---|
| Normal set: | If $(\Delta_z \geq \Delta_{min}) \Delta_6 = \Delta_z$ | |
| | If $(\Delta_z \leq \Delta_{min}) \Delta_{11} = -\Delta_z$ | |
| Odd set: | if $(\Delta_z \geq \Delta_{min}) \Delta_9 = \Delta_z$ | |
| | If $(\Delta_z \leq \Delta_{min}) \Delta_{11} = -\Delta_z$ | |
| Even set: | If $(\Delta_z \geq \Delta_{min}) \Delta_6 = \Delta_z$ | |
| | If $(\Delta_z \leq -\Delta_{min}) \Delta_8 = -\Delta_z$ | |

These values of $\Delta_i$ and $\Delta_{min}$ are stored, so that they can, later during the current control cycle, be combined with other commands. As mentioned, pitch control by means of the magnetic torquers is not possible, so thrusters must be used for pitch torquing.

The attitude command processing logic (ACPL) associated with distributor 296 of FIG. 2 uses the magnetic torquers for roll and yaw control to the greatest extent possible, to avoid the need to operate the thrusters, and thereby save fuel. The ACPL, in general, avoids the need for pulse-width modulation or throttling commands for the magnetic torquers, which might consume too much communication path bandwidth, by (a) if the torque requirement in roll or yaw is less than the magnetic torque which is available at maximum magnetic torquer current, commanding the magnetic torquer to be OFF for the current control cycle, and (b) if the torque requirement is greater than that which the magnetic torquer is capable of supplying, enabling the magnetic torquer at maximum current for the current control cycle. The ACPL also estimates the torque which has not been supplied by the magnetic torquer, to be made up by a thruster during the current command cycle, or possibly during the next following control cycle. The ON or OFF state of a magnetic torquer is established by setting the torquer state $S = (S_{yct} \text{ or } S_{rct})$ on that axis to either true or false, and transmitting the signal to the spacecraft for execution. Note that $S_{rct}$ is the state of the roll-axis control magnetic torquer (RCT), which generates a yaw control torque, while $S_{yct}$ is the state of the yaw-axis control torquer (YCT), which generates a roll control torque. Assuming that magnetic torquer control is enabled (that the torquers are available for use), the torque demand on each axis is compared with a magnetic torque threshold for that axis. The magnetic torque threshold is based on an average value of the Earth's magnetic field and the magnetic torquer dipole. If the torque demand on an axis is less than the magnetic torque threshold on that axis, the torque demand on that axis is zeroed, and the torquer state $S=(S_{yct}$ or $S_{rct})$ on that axis is set to OFF:

$$IF(|T_c| < M_t) \; THEN \qquad (15)$$
$$T_c = 0$$
$$S = 0 \; (off)$$
$$ENDIF$$

where $T_c$ is the control torque produced by the PID block for that axis. On the other hand, if the torque demand on a roll or yaw axis exceeds the magnetic torque threshold, the torquer state for that axis is set to ON, the magnetic torque is defined, and the control torque demands are modified to carry unused torques over to the thrusters. The calculation is initiated for the yaw axis by, first, setting the default value of the magnetic control torque to zero $$\overline{T}_m = 0 \qquad (16)$$

following which the actual determination is made $$IF(|T_{c_x}| \geq M_{t_x}) \; THEN \qquad (17)$$
$$IF(T_{c_x} > 0) \; THEN$$
$$S_{rct} = -1 (on \; negative)$$
$$ELSE$$
$$S_{rct} = 1 (on \; positive)$$
$$ENDIF$$
$$T_c = T_c - S_{rct} \, \overline{T}_{mag_{rct}}$$
$$\overline{T}_m = S_{rct} \, \overline{T}_{mag_{rct}}$$
$$ENDIF$$

where:

$M_{t_x}$ is a threshold constant, which is equal to the total torque which the torquer can provide in the yaw direction, based on the known magnetic dipole moment of the torquer, and an assumed average value of the Earth's magnetic field; and $\overline{T}_{mag_{rct}}$ is the three-component vector estimate of the torque produced by the RCT (in the case of a positive command), based on same known torquer magnetic dipole moment, and average Earth's magnetic field value.

It should be noted that the value of $M_{tx}$ may be selected to be higher than the actual estimated torque, in order to prevent magnetic torquer command cycling in response to noise in the torque demand. Equation (17) determines the state of $S_{rct}$, and the value of $\overline{T}_{mag_{rct}}$, which are both yaw axis determinations. The same processing is performed for the roll axis, to determine the state of $S_{yct}$ and the value of $\overline{T}_{mag_{yct}}$.

$$IF(|T_{c_y}| \geq M_{t_y}) \; THEN \qquad (18)$$
$$IF(T_{c_y} > 0) \; THEN$$
$$S_{yct} = 1 (on \; positive)$$
$$ELSE$$
$$S_{yct} = -1 (on \; negative)$$
$$ENDIF$$
$$\overline{T}_c = \overline{T}_c - S_{yct} \, \overline{T}_{mag_{yct}}$$
$$\overline{T}_m = \overline{T}_m + S_{yct} \, \overline{T}_{mag_{yct}}$$
$$ENDIF$$

where:

$M_{t_y}$ is a threshold constant, which is equal to the total torque which the torquer can provide in the roll direction, based on the known magnetic dipole moment of the torquer, and an assumed average value of the Earth's magnetic field; and $\overline{T}_{mag_{yct}}$ is the three-component vector estimate of the torque produced by the RCT (in the case of a positive command), based on magnetic dipole moment of the torquer and average Earth's magnetic field value. As in the case of the roll calculations, the value of $M_{ty}$ may be selected to be higher than the actual value. Note that the calculations are sequential, in that equations 16, 17, and 18 are evaluated in the stated order.

The yaw and roll thruster impulse demands, required to make up the amount of yaw and roll torque missing or lacking because of the torque limitations of the magnetic torquer, taking into account the operating state of the magnetic torquer, are then calculated $$I_x = \Delta_c T_{c_x}$$
$$I_y = \Delta_c T_{c_y} \qquad (19)$$

The vector of the yaw and roll impulse demands, $\overline{I}_{xy} = (I_x, I_y)$ is then multiplied by the pseudoinverse thruster selection (PITS) matrix $\overline{M}$, as known in the art, and as described in U.S. Pat. No. 5,140,525, issued Aug. 18, 1992 in the name of Shankar et al. The $\overline{M}$ matrix is termed $\overline{Q}$ in the Shankar et al. patent.

$$\overline{\Delta}_{yr} = \overline{M} \overline{I}_{xy} \qquad (20)$$

is the vector of yaw-roll pulsewidths. These pulses are assigned to various ones of the thrusters, as explained in more detail in the above-mentioned Shankar et al. patent. The PITS matrix which is used depends upon availability of thrusters. All of the elements of the pulse width vector $\overline{\Delta}_{yr}$ are limited and resolved in accordance with equations 11, 12 and 13 before allocation to the thrusters. These pulsewidths $\Delta$ are sent from distributor 296 of FIG. 2, by path 297b, to transmitter 299 for transmission to the spacecraft, and are also directed over path 297a to torque estimator 298 to aid in the estimation of the applied torque.

Torque estimator block 298 of FIG. 2 receives the thruster pulsewidths $\Delta_i$ and the magnetic torque $T_m$ from distributor 296. The pulsewidths are used to calculate the average thruster torque $T_t$ about each control axis, where $\overline{T}_t = (T_{tx}, T_{ty}, T_{tz})$, over the processing intervals of the filters of the attitude error processing logic (AEPL).

$$T_{t_j} = \frac{\Sigma T_{e_{ij}}}{\Delta t_j} \qquad (21)$$

where:

$T_e$ are the estimated control torques for the thrusters; and $\Delta t_j$ is the AEPL filter processing interval for the $j^{th}$ axis.

The average thruster torque $\overline{T}_t$ is added to the magnetic torquer torque $\overline{T}_m$ in torque estimator block 298 of FIG. 2, to generate the estimated pitch, roll and yaw torque vector $\overline{T}_e = (T_{ex}, T_{ey}, T_{ez})$.

$$\overline{T}_e = \overline{T}_t + \overline{T}_m \qquad (22)$$

As described above, these torques are coupled to roll, pitch, and yaw control processors 232, 234, and 236.

Figure 6:
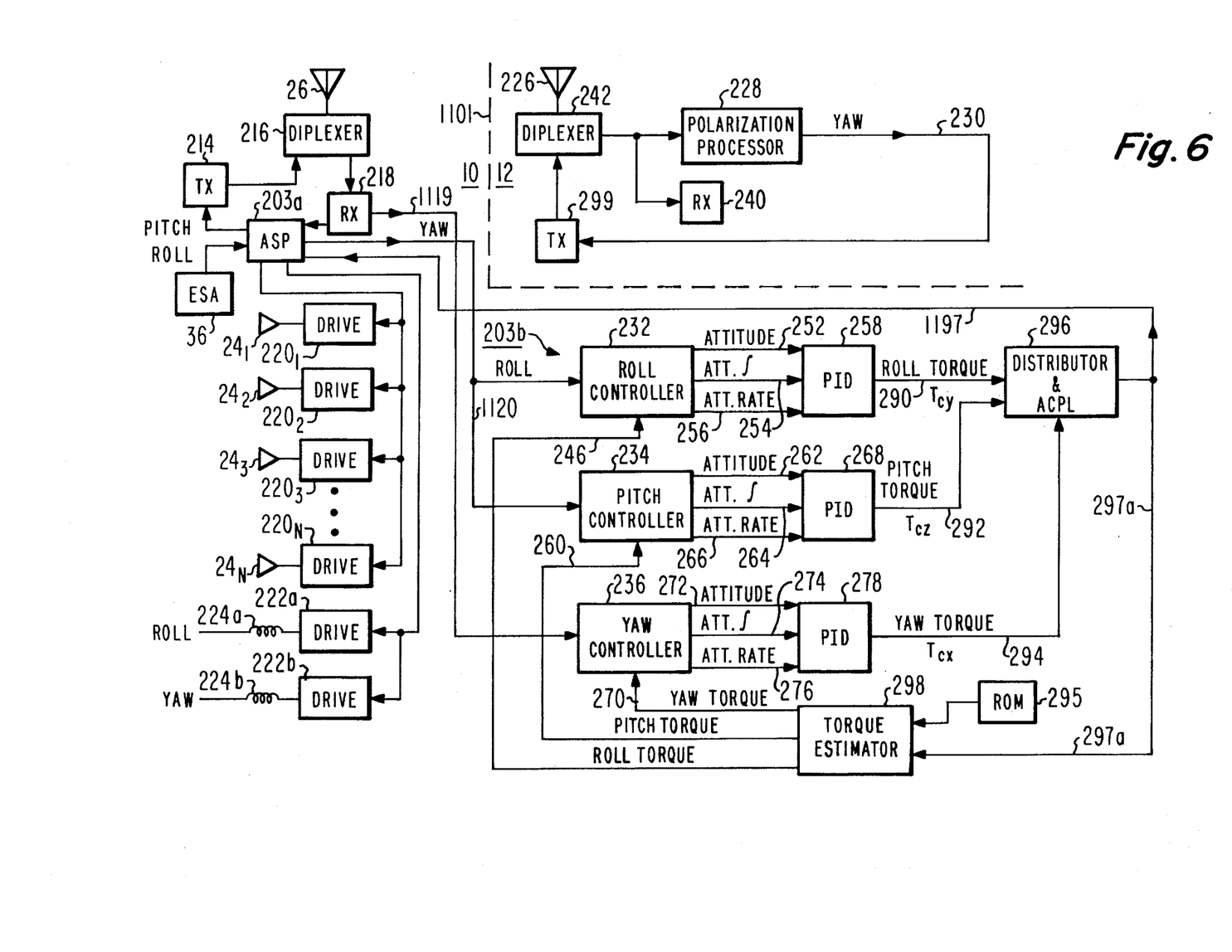
FIG. 6 is a block diagram similar to that of FIG. 2, but with the principal portion of the processing on-board the spacecraft.

FIG. 6 represents the same type of attitude control system as that of FIG. 2, but with most of the processing performed aboard the spacecraft. Elements of FIG. 6 corresponding to those of FIG. 2 are designated by like reference numerals. In FIG. 6, a dash line 1101 separates the portion of the attitude control system which is on spacecraft 10 from that portion which is at ground station 12. As illustrated, the roll and pitch signals originating from ESA 36 are applied from ASP 203a by way of a path 1120 directly to roll and pitch controller blocks 232, 234 of a second portion 203b of the on-board ASP. The yaw signals are generated at ground station 12 by polarization processor 228 as described in conjunction with FIG. 1, and the resulting yaw-representative signal is directed by path 230 directly to transmitter (TX) 299. Transmitter 299 transmits the yaw-representative signals by way of antenna 12a back to the spacecraft. Within the spacecraft, the signal received by antenna 26 is routed to receiver (RX) 218, and the yaw-representative signals are directed by way of a path 1119 to yaw controller 236. The processing within ASP portion 203b follows the description of the corresponding portions of FIG. 2. The distributor and ACPL 296 directs its signals by way of path 1197 to ASP portion 203a. Instead of sensing yaw at the ground station, the arrangement of FIG. 6 may use an on-board yaw sensor, such as that described in U.S. Pat. No. 5,107,434, issued Apr. 21, 1992 in the name of Paluszek, in which case the attitude controller does not depend at all upon ground-based sensing.

It should be noted that there are two dead-bands in the control of roll and yaw; the first is the dead-band before the magnetic torquer is energized, and the second is the dead-band inherent in the minimum pulsewidth of the thrusters. Thus, errors can accumulate slowly, until, during a particular control cycle, the corresponding magnetic torquer is energized. However, the torque demand will likely not be great enough to exceed the torque corresponding to the minimum thruster pulsewidth. With slow accumulation of attitude error, the magnetic torquer may be energized several times, until, at some later time, the torque demand requires a minimum pulsewidth firing. Thus, the thrusters can be expected to fire infrequently, if at all, during normal operation. However, they are available for large amounts of torque in the event of a larger transient.

The described system overcomes a disadvantage of attitude control systems in which the attitude signal can be even more noisy. The ESA is notoriously noisy, and the yaw determination as determined by the polarization of the received radio-frequency signal can be even more noisy. For a zero-momentum spacecraft, attitude rate feedback is necessary for a stable closed feedback loop. As described above, attitude rate is determined by low-pass filtering the attitude signal, and then differentiating the filtered attitude signals. The large amounts of noise in the attitude signals can concomitantly require large amounts of low-pass filtering. This low-pass filtering, in turn, limits the bandwidth of the attitude control loop, thereby limiting the disturbance rejection, and slowing the transient response. In the present case, large amounts of filtering are required to reduce limit cycling, which would result in propellant-wasting thruster cycling. Also, where ground-based control of the thruster firing is required, frequent thrust actuator commands, which are attributable to attitude sensor noise, can require excessive amounts of communication link usage, to the detriment of other housekeeping communications or of the payload communications. According to an aspect of the invention, low-frequency attitude information is combined with high-frequency actuator information to obtain low-noise, wideband rate signals, which allow stable, high bandwidth attitude control loops. More particularly, the actuator or thruster command signals (thruster pulse widths or magnetic torquer states) are used to derive estimated spacecraft body torques. These torques are integrated and high-pass filtered to generate low-noise, high-frequency rate information. The low-noise, high-frequency rate estimate is used in conjunction with the attitude errors and attitude integral to generate the torque demands by means of a PID controller. The resulting torque demands are distributed to the torquers, and back to the torque estimator.

According to another aspect of the invention, the magnetic torquers are enabled at a fixed current during those control cycles in which the torque demand equals or exceeds the torque estimated to be available from the magnetic torquer. The difference is taken between the demanded and magnetic torques, and the difference is applied to control the pulse-width of the thrusters. Thus, the thrusters and the magnetic torquers are both available for use during each control cycle. This is particularly important where a strong environmental effect acting on the spacecraft might overwhelm the magnetic yaw/roll control and tend to cause the spacecraft to rotate outside of the yaw sensing region or away from the Earth, which could cause loss of control and mandate entering an acquisition mode. By having the thrusters available during each control cycle, rapid corrections can be made, if necessary, to prevent loss of control, but during normal operation, in the absence of strong environmental factors, the thruster usage is minimized.

Other embodiments of the invention will be apparent to those skilled in the art. More particularly, the described processing may be performed by dedicated hardware, by one or more software-controlled general-purpose processors, or by firmware, as is well known in the art. In an embodiment in which the control system of the invention is incorporated into an autonomous attitude control spacecraft, the magnetic torquers may be actuated during each control cycle with a torquer proportional to the torque demand, rather than the zero-torque or full-on states mandated by the limitations of the communication path. While chemical thrusters have been described, other thrusters may be used, such as catalyst- or electrically-enhanced chemical thrusters (using resistance heaters or arcs), or ion or other charged-particle thrusters. While antenna 226 of FIG. 2 has been described as being different from antenna 12a of FIG. 1, they may be the same antenna.

What is claimed is:

1. An attitude control system for a zero-momentum spacecraft which includes a body, for maintaining said body in a particular attitude, said system comprising:

magnetic torquing means mounted on said body, for, when enabled, torquing said body about a particular axis;

thrusters mounted on said body, for, when enabled, producing torque about said particular axis;

a source of attitude command signals representing said particular attitude;

attitude sensing means, for sensing the attitude of said spacecraft body about said particular axis, and for generating attitude-representative signals representing said attitude;

attitude error processing means coupled to said attitude sensing means and to said source of attitude command signals, for determining, during each of a plurality of recurrent control intervals, the amount of torque required about said particular axis for tending to maintain said particular attitude;

distribution means coupled to said attitude error processing means, to said magnetic torquing means, and to said thrusters, for, during each of said control intervals, energizing said magnetic torquing means in response to said torque required, and for, during each of said recurrent control intervals, if said torque required is greater than the torque which said magnetic torquing means provides, enabling at least one of said thrusters for generating torque representative of the difference between said torque required and the torque which said magnetic torquing means supplies.

2. A system according to claim 1, wherein said distribution means comprises means for enabling said magnetic torquing means with a current which is constant during each one of said recurrent control intervals.

3. A system according to claim 1, wherein said distribution means comprises means for enabling said thrusters with pulse-width modulated drive.

4. A system according to claim 1, wherein said distribution means are located at a ground station, and telemetry is used to interconnect said attitude error processing means and said distribution means with said magnetic torquing means, said thruster means, and said attitude sensing means.

5. A system according to claim 4, wherein said source of attitude command signals is located at said ground station.

6. A system according to claim 4, wherein said first, second and third torquing means comprise chemical thrusters mounted on said spacecraft body.

7. An attitude control system for a zero-momentum spacecraft which includes a body, for maintaining said body in a particular attitude, said system comprising:

magnetic torquing means mounted on said body, for, when enabled, torquing said body about a particular axis;

thrusters mounted on said body, for, when enabled, producing torque about said particular axis;

a source of attitude command signals representing said particular attitude;

attitude sensing means, for sensing the attitude of said spacecraft body about said particular axis, and for generating attitude-representative signals representing said attitude;

attitude error processing means coupled to said attitude sensing means and to said source of attitude command signals, for determining, during each of a plurality of recurrent control intervals, the amount of torque required about said particular axis for tending to maintain said particular attitude;

distribution means coupled to said attitude error processing means, to said magnetic torquing means, and to said thrusters, for, during each of said control intervals, energizing said magnetic torquing means in response to said torque required, and for, during each of said recurrent control intervals, if said torque required is greater than the torque which said magnetic torquing means provides, enabling at least one of said thrusters for generating torque representative of the difference between said torque required and the torque which said magnetic torquing means supplies, said attitude control system further comprising:

torque estimating means coupled to said attitude error processing means and to said distribution means, for, in response to energization of said magnetic torquing means and of said thrusters, generating applied torque signals representing an estimate of the torque provided by the combination of said magnetic torquing means and said thrusters; and processing means associated with said attitude error processing means for summing integrated high-frequency components of said applied torque signals with low-frequency components of the derivative of said attitude-representative signals.

8. An attitude control system for a zero momentum spacecraft having a body which is to be maintained in a particular attitude, said system comprising:

torquing means coupled to said body for, in response to torquing means drive signals, producing torque about a particular control axis;

attitude sensing means coupled to said body for generating attitude signals representative of the attitude of said body about said control axis;

attitude signal processing means coupled to said attitude sensing means for generating attitude rate signals from said attitude signals;

torque estimating means coupled to receive said torquing means drive signals, for generating estimated torque signals representative of estimates of the torque applied to said body by said torquing means;

summing means coupled to said attitude signal processing means and to said torque estimating means for combining portions of said attitude rate signals representative of low-frequency components of said attitude rate with portions of said estimated torque signals representing higher-frequency components of said torque applied to said body, to form combined attitude rate signals; and further processing means coupled to said summing means, to said attitude sensing means, and to said torquing means, for using at least said combined attitude rate signals for generating said torquing means drive signals, for closing a feedback loop tending to maintain said body at said particular attitude.

9. A system according to claim 8, wherein said further processing means comprises:

integration means coupled to said attitude sensing means for generating attitude integral signals from said attitude signals; and PID processing means coupled to said summing means for receiving said combined attitude rate signals, and to said integration means for receiving said attitude integral signals, and including attitude signal coupling means coupled to said attitude sensing means, said PID processing means being for combining said attitude-representative signals, said attitude integral signals, and said combined attitude rate signals, to generate said torquing means drive signals.

10. A system according to claim 9, wherein said attitude signal coupling means comprises low-pass filtering means for low-pass filtering said attitude signals to form reduced-noise attitude signals.

11. A system according to claim 10, wherein said low-pass filtering means is a second-order low-pass filter.

12. A system according to claim 11, wherein said summing means comprises second-order low-pass filter means for low pass filtering said reduced noise attitude signals, and further comprises second-order filter means for integrating and high-pass filtering said estimated torque signals.

13. A system according to claim 8, wherein said torquing means comprises thruster means and magnetic torquing means; and said processing means further comprises distribution means, for distributing said torquing means drive signals to said magnetic torquing means and to said thruster means for, during each of recurrent control intervals, energizing said magnetic torquing means in response to the required torque represented by said torquing means drive signals, and for, during each of said recurrent control intervals, if said required torque is greater than the torque which said magnetic torquing means provides, enabling said thruster means for generating torque representative of the difference between said required torque and said torque which said magnetic torquing means provides.

14. A method for controlling the attitude of a spacecraft during recurrent control cycles, comprising the steps of:

determining the torque required about a predetermined control axis to maintain a predetermined attitude;

during each one of recurrent control cycles, enabling a magnetic torquer if said torque required exceeds a threshold value;

during each one of said recurrent control cycles, taking the difference between said torque required and an estimate of the torque produced by said magnetic torquer; and during each of said recurrent control cycles, energizing thruster means to generate a torque equal to said difference.

15. A method according to claim 14, wherein said step of enabling a magnetic torquer comprises the step of enabling said magnetic torquer at full current.

16. A method according to claim 14, wherein said step of enabling a magnetic torquer includes the step of enabling said magnetic torquer at a current if said torque required exceeds a threshold value substantially equal to the estimated torque produced by said magnetic torquer at said current.

17. A method according to claim 16, wherein said current is the maximum allowable current to said magnetic torquer.

18. A method for controlling the attitude of a spacecraft during recurrent control cycles, comprising the steps of:

determining the torque required about a predetermined control axis to maintain a predetermined attitude;

during each one of recurrent control cycles, enabling a magnetic torquer if said torque required exceeds a threshold value;

during each one of said recurrent control cycles, taking the difference between said torque required and an estimate of the torque produced by said magnetic torquer;

during each of said recurrent control cycles, energizing thruster means to generate a torque equal to said difference;

wherein said step of determining the torque required comprises the further steps of:

low-pass filtering an attitude rate signal derived from an attitude sensor to form low-pass filtering attitude rate signals;

integrating and high-pass filtering an estimated torque signal derived from said steps of (a) enabling a magnetic torquer and (b) energizing thruster means to generate high-pass filtered estimated torque signals; and summing said low-pass filtered attitude rate signals and said integrated and high-pass filtered estimated torque signals to form composite attitude rate signals.

19. A method for controlling the attitude of a spacecraft, comprising the steps of:

generating attitude rate signals representative of the rate of change of attitude of said spacecraft;

filtering said attitude rate signals to pass a range of frequencies below a particular frequency and reject a range of frequencies above said particular frequency, to form low-pass attitude rate signals;

enabling spacecraft body torquing means in response to torque enable signals;

estimating the torque generated by said torquing means, to produce estimated torque signals;

integrating and filtering said estimated torque signals to pass a range of frequencies above said particular frequency and reject a range of frequencies below said particular frequency, to form integrated high-pass estimated torque signals;

summing said low-pass attitude rate signals and said integrated high-pass estimated torque signals to generate a composite attitude rate signal; and using at least said composite attitude rate signal, generating said torque enable signals.

20. A method according to claim 19, wherein said step of enabling spacecraft body torquing means comprises the further steps of:

during each of recurrent spacecraft torquer control cycles, enabling a magnetic torquer if said torque enable signals represent a spacecraft torque demand greater than a threshold value;

during each of said recurrent control cycles, enabling thruster means for generating a torque equal to the difference between said spacecraft torque demand and the estimated magnitude of the torque which said magnetic torquer provides.

21. An attitude control system for a zero-momentum spacecraft having a body including a payload which is to be maintained in an Earth-pointing attitude, said control system comprising:

a source of three-axis attitude bias command signals;

first, second and third torquing means coupled to said body, for applying torques to said body about first, second and third mutually orthogonal axes, respectively, in response to weighted control signals;

attitude sensing means coupled to said body for generating attitude signals representative of spacecraft attitude;

estimated control torque generating means coupled to receive said weighted control signals, for generating estimated control torque signals representative of the control torque applied by said torquing means in response to said weighted control signals;

first, second and third processors coupled to said attitude sensing means and to said source of three-axis attitude bias command signals for at least generating attitude error signals about each of said first, second and third axes, and for, in at least one of said three axes, (a) low-pass prefiltering said attitude signals to form low-pass prefiltered attitude signals with reduced noise, (b) subtracting said attitude signals from said prefiltered attitude signals to generate attitude error signals, (c) integrating said attitude error signals to generate attitude integral signals, (d) differentiating said low-passed filtered attitude signals to form rate signals, (e) low-pass filtering said rate signals to generate low-noise rate signals, (f) integrating and high-pass filtering said estimated control torque signals to form high-frequency rate estimate signals, (g) summing said low-noise rate signals with said high-frequency rate estimate signals, to form pseudo-rate error signals;

PID control means coupled to at least one of said first, second and third processors, for multiplying said attitude error signals, attitude integral signals, and pseudo-rate signals by first, second and third gains, respectively, to form weighted attitude error signals, weighted attitude integral signals, and weighted pseudo-rate signals, and for summing said weighted attitude error signals, weighted attitude integral signals, and weighted pseudo-rate signals to form a summed attitude control signal, and for multiplying said summed attitude control signals by a controller gain for the corresponding axis, to thereby generate a weighted control signal for said axis; and distribution means coupled to said PID control means and to said thrusters, for distributing said weighted control signals to those thrusters providing control about said axis, and for converting said weighted control signal to a form usable by said thrusters, for thereby closing a control loop tending to maintain said attitude of said spacecraft.

* * * * *